United States Patent [19]

Kitaguchi et al.

[11] Patent Number: 4,528,258
[45] Date of Patent: Jul. 9, 1985

[54] PROCESS FOR FORMING IMAGE
[75] Inventors: Hiroshi Kitaguchi; Hideki Naito, both of Kanagawa, Japan
[73] Assignee: Fuji Photo Film Co., Ltd., Kanagawa, Japan
[21] Appl. No.: 588,259
[22] Filed: Mar. 12, 1984
[30] Foreign Application Priority Data Mar. 11, 1983 [JP] Japan .................................. 40247/83

[51] Int. Cl.³ .......................... G03C 1/40; G03C 5/54
[52] U.S. Cl. .................................... 430/203; 430/223; 430/351; 430/562
[58] Field of Search ................ 430/203, 223, 562, 351
[56] References Cited

U.S. PATENT DOCUMENTS 4,013,633  3/1977  Haase et al. .......................... 430/223
4,245,028  1/1981  Fujita et al. ......................... 430/223
4,463,079  7/1984  Naito et al. ......................... 430/223

FOREIGN PATENT DOCUMENTS 0066282 12/1982 European Pat. Off. ............ 430/203

Primary Examiner—Richard L. Schilling
Attorney, Agent, or Firm—Sughrue, Mion, Zinn, Macpeak & Seas

[57] ABSTRACT

A process for forming an image which comprises heating a light-sensitive material comprising a support having thereon at least a light-sensitive silver halide, a binder and a dye-releasing redox compound which is reductive to the light-sensitive silver halide and which is capable of releasing a hydrophilic dye upon reaction with the light-sensitive silver halide on heating, after imagewise exposure or simultaneously with imagewise exposure, in a substantially water-free condition the dye-releasing redox compound being represented by the formula (I)

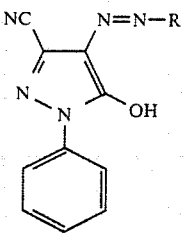

wherein R represents a phenyl group having a hydroxy-substituted alkoxy group or an alkoxy-substituted alkoxy group at at least the 2-position thereof with respect to the diazo group and a group of the formula —SO$_2$N-H—Y at the 5-position thereof with respect to the diazo group where Y represents a group capable of being oxidized silver halide to release a dye moiety including the —SO$_2$NH moiety.

11 Claims, No Drawings

PROCESS FOR FORMING IMAGE

FIELD OF THE INVENTION

The present invention relates to a novel process for forming a dye image by heating a light-sensitive material in a substantially water-free condition.

Furthermore, the present invention relates to a novel light-sensitive material containing a dye releasing redox compound which releases a hydrophilic dye upon reaction with a light-sensitive silver halide by heating in a substantially water-free condition.

More particularly, the present invention relates to a novel process for forming a dye image by transferring a dye released by heating into a dye fixing layer.

BACKGROUND OF THE INVENTION

A photographic process utilizing silver halide has heretofore been widely used due to its excellent photographic characteristics, such as sensitivity, control of gradation, etc., as compared with other photographic processes such as an electrophotographic process or a diazo photographic process. In recent years, with respect to image formation process for light-sensitive materials using a silver halide, a technique capable of easily and quickly obtaining an image has been developed by changing the conventional wet development process using, for example, a developing solution, into a dry development process such as a process using heat.

A heat-developable light-sensitive material is known where this technique is used. Such heat-developable light-sensitive materials and processes therefor are described in, for example, *Shashin Kogaku no Kiso*, Corona Co., Ltd., pages 553–555, *Eizo Joho*, April 1978, page 40, *Nebletts Handbook of Photography and Reprography*, 4th Ed., Van Nostrand Reinhold Co., pages 32–33, U.S. Pat. Nos. 3,152,904, 3,301,678, 3,392,020 and 3,457,075, British Pat. Nos. 1,131,108 and 1,167,777, and *Research Disclosure*, June 1978, pages 9–15 (RD-17029).

Many processes for obtaining color images using a dry process have been proposed.

With respect to processes for forming color images by the reaction of an oxidation product of a developing agent with a coupler, use of a p-phenylenediamine type reducing agent and a phenolic coupler or an active methylene coupler as described in U.S. Pat. No. 3,531,286, a p-aminophenol type reducing agent as described in U.S. Pat. No. 3,761,270, a sulfonamidophenol type reducing agent as described in Belgian Patent 802,519 and *Research Disclosure*, pages 31 and 32 (Sept., 1975) and the combination of a sulfonamidophenol type reducing agent and a 4-equivalent coupler as described in U.S. Pat. No. 4,021,240, has been proposed.

These processes, however, are disadvantageous in that turbid color images are formed, because a reduced silver image and a color image are simultaneously formed in the exposed area after heat-development. In order to eliminate these disadvantages, a process which comprises removing the silver image by liquid processing or a process which comprises transferring only the dye to another layer, for example, a sheet having an image receiving layer has been proposed. However, the latter process is not desirable because it is not easy to separate the dye from unreacted substances and transfer the dye only.

Another process which comprises introducing a nitrogen containing heterocyclic group into a dye, forming a silver salt and releasing a dye by heat-development has been described in *Research Disclosure*, No. 16966, pages 54 to 58 (May, 1978). Clear images cannot be obtained using this process, because it is difficult to control the release of dyes from the unexposed areas, and thus it is not a generally applicable process.

Also, processes for forming a positive-working color image using a silver dye bleach process utilizing heat, with useful dyes and methods for bleaching have been described, for example, in *Research Disclosure*, No. 14433, pages 30 to 32 (April, 1976), ibid., No. 15227, pages 14 and 15 (December, 1976) and U.S. Pat. No. 4,235,957.

However, this process requires an additional step and an additional material for accelerating the bleaching of the dyes, for example, heating with a superposed sheet with an activating agent. Furthermore, this process is not desirable because the resulting color images are gradually reduced and bleached by free silver which is present during long periods of storage.

Moreover, a process for forming a color image utilizing a leuco dye is described, for example, in U.S. Pat. Nos. 3,985,565 and 4,022,617. However, this process is not desirable because it is difficult to incorporate the leuco dye in the photographic material in a stable manners and coloration gradually occurs during storage.

Another disadvantage is that generally the above-described processes require quite a long time for development and result in images with high fog and low density.

SUMMARY OF THE INVENTION

The present invention provides a novel process for forming a dye image by heating the photographic material in a substantially water-free condition and overcomes the problems encountered in conventional materials.

Accordingly, an object of the present invention is to provide a novel process for forming a color image by transferring a mobile hydrophilic dye released upon heating into a dye fixing layer in a substantially water-free condition to obtain a dye image.

Another object of the present invention is to provide a novel light-sensitive material comprising a novel dye releasing redox compound capable of releasing a mobile dye upon reaction with the light-sensitive silver halide by heating in a substantially water-free condition.

Still another object of the present invention is to provide a process for obtaining a distinct color image using a simple and easy procedure.

These objects of the present invention are attained by a process for forming an image, which comprises heating a light-sensitive material comprising a support having thereon at least a light-sensitive silver halide, a binder, and a dye-releasing redox compound which is reductive to the light-sensitive silver halide and which is capable of releasing a hydrophilic dye upon reaction with the light-sensitive silver halide on heating, after imagewise exposure or simultaneously with imagewise exposure, in a substantially water-free condition the dye-releasing redox compound being represented by the formula (I) to imagewise form a mobile dye.

DETAILED DESCRIPTION OF THE INVENTION

The term "dye image" as used herein includes both multicolor and monocolor dye images. Monocolor dye images include a monocolor image obtained by mixing two or more dyes.

According to the image formation process of the present invention, a silver image and a mobile dye image corresponding to the silver image can be formed simultaneously by merely heating the material simultaneously with or after imagewise exposure. In other words, in the image formation of the present invention, when the heat-developable light-sensitive material is imagewise exposed and developed by heating in a substantially water-free condition, a redox reaction occurs between the light-sensitive silver halide and the dye releasing redox compound due to the action of the exposed light-sensitive silver halide as a catalyst, thereby forming a silver image in the exposed area. At this stage, the dye releasing redox compound is oxidized by the silver halide into the corresponding oxidation product. As a result, a hydrophilic mobile dye is released, and the silver image and mobile dye are formed in the exposed area. The presence of a dye releasing aid at this stage accelerates the above-described reaction. By transferring the thus formed mobile dye into, for example, a dye fixing layer, the desired dye image can be obtained.

The above explanation has been made as to the use of a negative-working emulsion. When an autopositive-working emulsion is used, the same is applicable with the exception that the silver image and mobile dye are formed in the unexposed areas.

The redox reaction between the light-sensitive silver halide and a dye releasing redox compound and the subsequent dye releasing reaction according to the present invention involve reactions which occur at high temperatures and also in a substantially water-free dry condition. The term "high temperature" as used herein means temperatures of about 80° C. or more. The term "substantially water-free condition" means a condition which is in an equilibrium state to the moisture in air but there is no supply of water from the outside of the system. Such a condition is described in T. H. James, *The Theory of the Photographic Process*, page 374, 4th Ed., Macmillan. Sufficient reactivity has been confirmed to be attained even in a substantially water-free condition from the fact that the reactivity of a test sample does not decrease even if it is vacuum dried at $10^{-3}$ mmHg for one day.

The dye releasing reaction has conventionally been believed to take place by the attack of a nucleophilic reagent and is usually carried out in a liquid having a pH of 10 or more. Therefore, it is unexpected that high reactivity can be attained at high temperatures in a substantially water-free condition. The dye releasing redox compound which can be used in the present invention undergoes a redox reaction with silver halide without the help of a so-called auxiliary developing agent although one can be used if desired. This is also an unexpected result which could not be anticipated from the knowledge of the conventional wet development system which is carried out at temperatures near ordinary temperature about 20° to 40° C.

The above-described reactions proceed smoothly particularly in the presence of an organic silver salt oxidizing agent, such as silver benzotriazole, to produce a high image density. It is, therefore, particularly preferable in the present invention that such an organic silver salt oxidizing agent be present in the system.

The dye-releasing redox compound which can be used in the present invention is represented by general formula (I)

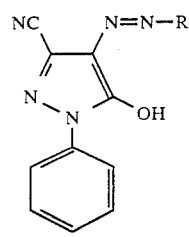

In general formula (I) above, R represents a phenyl group having a hydroxy-substituted ($C_1$–$C_{12}$, preferably $C_1$–$C_6$) alkoxy group or a ($C_1$–$C_{12}$, preferably $C_1$–$C_6$) alkoxy-substituted ($C_1$–$C_{12}$, preferably $C_1$–$C_6$) alkoxy group at at least the 2-position thereof with respect to the diazo-group and a group of the formula-$SO_2NH$—Y at the 5-position thereof with respect to the diazo group. The phenyl group may have one or more additional substituents.

Examples of suitable hydroxy-substituted alkoxy groups or alkoxy-substituted alkoxy groups include a 2-methoxyethoxy group, a 2-ethoxyethoxy group, a 2-hydroxyethoxy group, a 2-(2-methoxyethoxy)ethoxy group, a 2-(2-ethoxyethoxy)ethoxy group, a 2-(2-hydroxyethoxy)ethoxy group, a 2-propoxyethoxy group, a 1-methyl-2-methoxyethoxy group, a 2-butoxyethoxy group, etc.

The alkoxy group contained in the above alkoxy groups as a substituent may further be substituted with an alkoxy group having 1 to 12 carbon atoms or the like.

Y represents a group represented by general formula (II), (III), (IV), (VI), (VII), (VIII) or (IX).

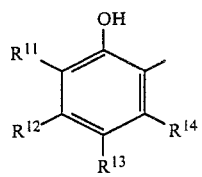

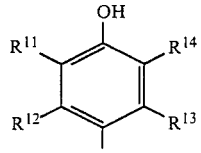

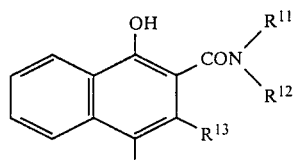

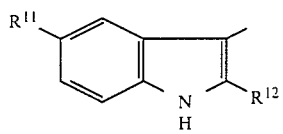

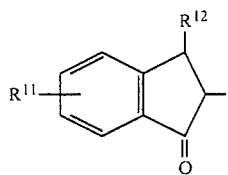

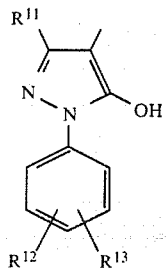

(VII)

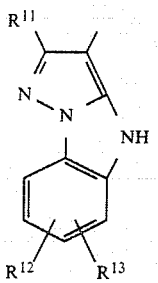

(VIII)

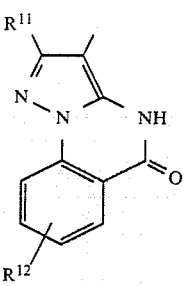

(IX)

wherein $R^{11}$, $R^{12}$, $R^{13}$ and $R^{14}$, which may be the same or different, each represent a hydrogen atom, an alkyl group having 1 to 22 carbon atoms (e.g., a methyl group, a dodecyl group, a 1,1,3,3-tetramethyl-butyl group, etc.), a cycloalkyl group having 5 to 22 carbon atoms (e.g., a cyclohexyl group, etc.), an aryl group having 6 to 22 carbon atoms (e.g., a phenyl group, a naphthyl group, etc.), an alkoxy group having 1 to 22 carbon atoms (e.g., an ettioxy group, a hexadecyloxy, etc.), an aryloxy group having 6 to 22 carbon atoms (e.g., a phenoxy group, etc.), an aralkyl group having 7 to 22 carbon atoms (e.g., a benzyl group, etc.), an acyl group having 1 to 22 carbon atoms (e.g., an acetyl group, etc.), an acylamino group having 1 to 22 carbon atoms (e.g., an acetylamino group, etc.), an alkylsulfonylamino group having 1 to 22 carbon atoms (e.g., a methylsulfonylamino group, etc.), an arylsulfonylamino group having 6 to 22 carbon atoms (e.g., a phenylsulfonylamino group, etc.), an aryloxyalkyl group having 7 to 22 carbon atoms (e.g., a phenoxyethyl group, etc.), an alkoxyalkyl group having 2 to 22 carbon atoms (e.g., a methoxyethyl group, etc.), an N-substituted carbamoyl group having 1 to 22 carbon atoms (e.g., an N,N-diethylcarbamoyl group, etc.), an N-substituted sulfamoyl group having 1 to 22 carbon atoms (e.g., an N,N-diethylsulfamoyl group, etc.), a halogen atom (e.g., chlorine, etc.), an alkylthio group having 1 to 22 carbon atoms (e.g., a hexylthio group, a dodecylthio group, etc.) or an arylthio group having 6 to 22 carbon atoms (e.g., a phenylthio group, etc.).

The alkyl moiety and the aryl moiety in the above described substituents may be further substituted with an alkoxy group having 1 to 22 carbon atoms (e.g., an ethoxy group, a hexadecyloxy group, etc.) a halogen atom (e.g., chlorine, etc.), a hydroxy group, a cyans group, an acyl group having 1 to 22 carbon atoms (e.g., an acetyl group, etc.), an acylamino group having 1 to 22 carbon atoms (e.g., an acetylamino group, etc.), a substituted carbamoyl group having 1 to 22 carbon atoms (e.g., an N,N-diethylcarbamoyl group, etc.), a substituted sulfamoyl group having 1 to 22 carbon atoms (e.g., an N,N-diethylsulfamoyl group, etc.), an alkylsulfonylamino group having 1 to 22 carbon atoms (e.g., a methylsulfonylamino group, etc.), an arylsulfonylamino group having 6 to 22 carbon atoms (e.g., a phenylsulfonylamino group, etc.), a substituted ureido group having 1 to 22 carbon atoms or a carboalkoxy group having 2 to 22 carbon atoms. Furthermore, the hydroxy group and the amino group included in the reducing group represented by Y may be protected by a protective group capable of conversion into a hydroxy group and an amino group by the action of a nucleophilic agent.

One feature of the present invention is that a compound of the general formula (I) contains an alkoxy- or hydroxy-substituted alkoxy group represented by R on the phenyl ring thereof derived from a diazo component at the 2-position with respect to the azo group. Another feature is that it contains a group of the formula —SO$_2$NH— in general formula (I) (i.e., the same position as $R^2$ in the general formula (I)) are described in Japanese Patent Application (OPI) No. 111344/79. The compounds, however, are disadvantageous since they release yellow dyes whose absorption occurs on the shorter wavelength side.

It has now been found that compounds capable of releasing a yellow dye having an adsorption desirable from the viewpoint of color reproduction can be obtained by the introduction of the above-described substitute alkoxy group into the position which R occupies in the compound of the general formula (I).

Further the dye-releasing redox compound used in the present invention, upon heat development, gives rise to high sensitivity, high transfer speed and high density of transferred dye image in a short time. Therefore, according to the present invention a heat-developable light-sensitive material is provided which has a high sensitivity and is capable of forming a yellow dye showing a desirable adsorption curve in a short time due to the presence of the above-described substituted alkoxy group at the position where R is attached.

Preferably, R represents a group of the general formula (X).

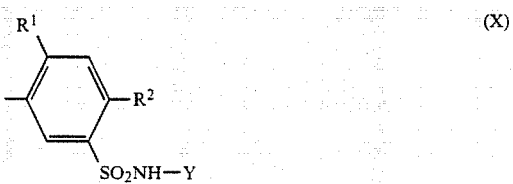

(X)

In the general formula (X), $R^1$ represents the alkoxy-substituted alkoxy group or hydroxy-substituted alkoxy group described hereinabove; $R^2$ represents a hydrogen atom or a group represented by $R^1$. It is preferred for $R^1$ to be the same as $R^2$.

In the general formula (X), preferred examples of $R^1$ include a 2-methoxyethoxy group, a 2-ethoxyethoxy group, a 2-hydroxyethoxy group, a 2-(2-methoxyethoxy)ethoxy group, a 2-(2-ethoxyethoxy)ethoxy group and a 2-(2-hydroxyethoxy)ethoxy group. Of these groups, a 2-methoxyethoxy group and a 2-ethoxyethoxy group are particularly preferred since starting materials for preparing compounds containing them are readily available and the compounds are highly effective.

The characteristics required for the reducing group Y are as follows.

1. The reducing group should be rapidly oxidized by the silver halide to effectively release a diffusible dye for image formation by the function of the dye releasing activator.

2. The reducing group Y has an extensive hydrophobic property, because it is necessary for the dye releasing redox compound to be non-mobile in a hydrophilic or hydrophobic binder and for only the released dye to be mobile.

3. The reducing group has excellent stability to heat and to the dye releasing activator and does not release the image forming dye until it is oxidized; and 4. The reducing group is easily synthesized.

Specific examples of preferred reducing groups Y which satisfy the above described requirements are shown below. In the examples, "—" represents the bond to the dye portion of the compounds of this invention.

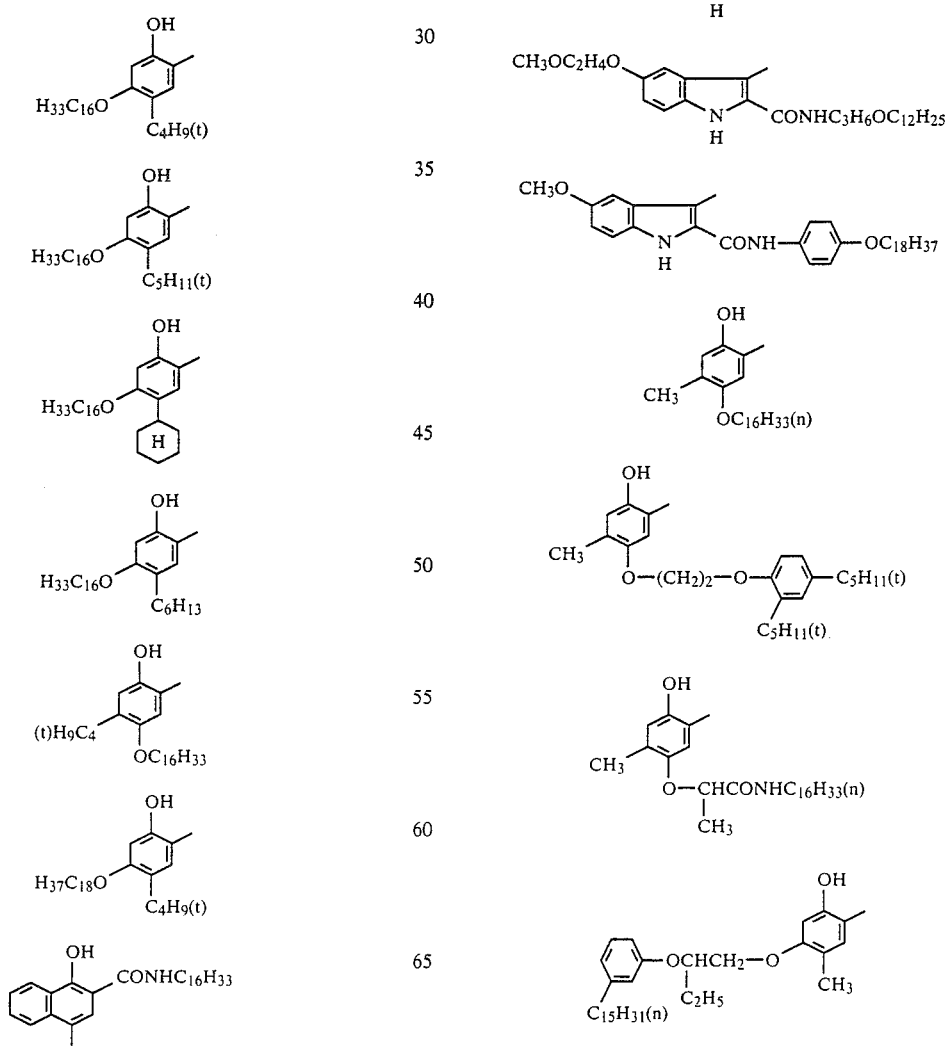

-continued
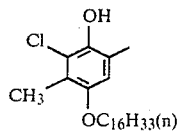
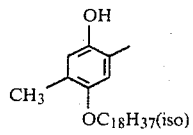
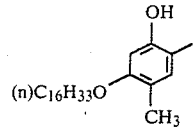
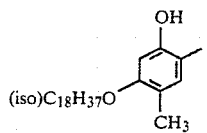
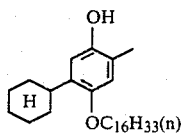
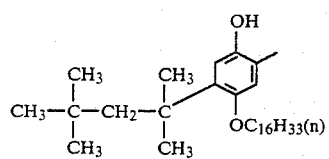
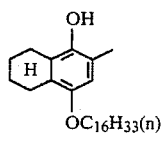
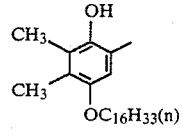
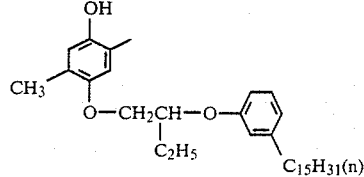
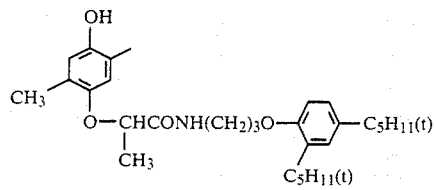
-continued
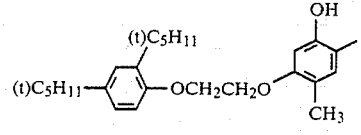
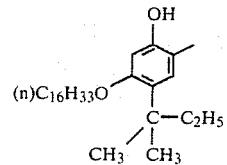
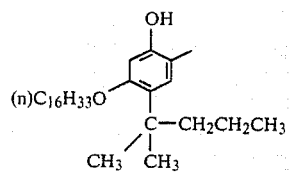
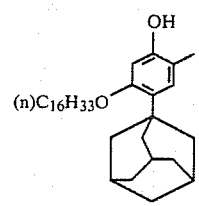
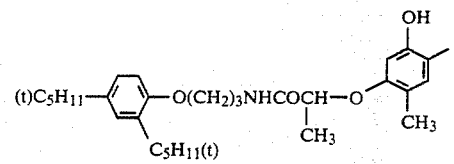
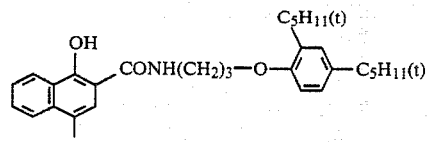
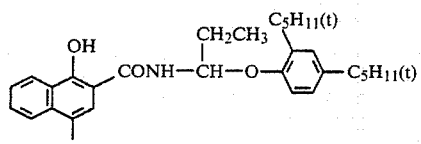
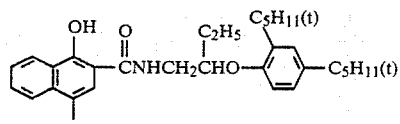
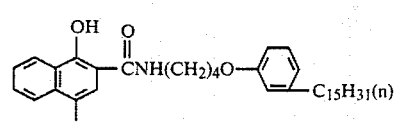
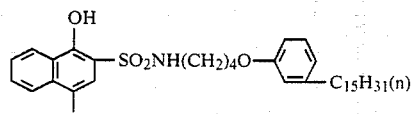
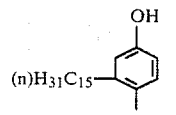

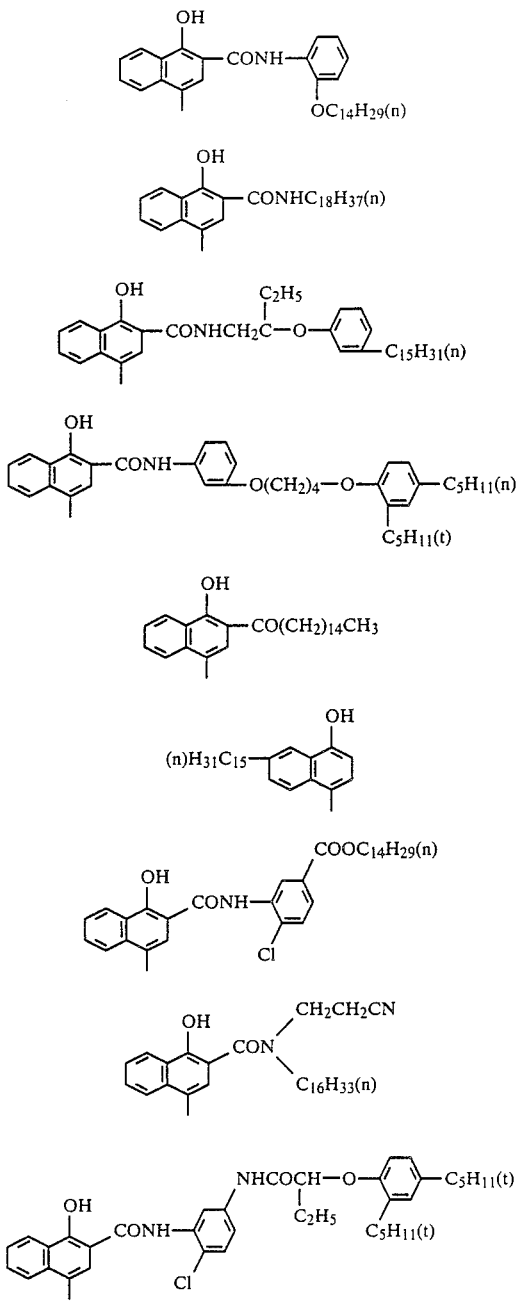

Suitable reducing groups which can be used in the present invention, include those groups as described, for example, in U.S. Pat. No. 4,055,428, Japanese Patent Application (OPI) Nos. 12642/81, 16130/81, 16131/81, 650/82 and 4043/82, U.S. Pat. Nos. 3,928,312 and 4,076,529, U.S. Pat. Nos. 4,135,929, 4,258,120, 4,053,312 and 4,198,235, Japanese Patent Application (OPI) No. 46730/78, U.S. Pat. Nos. 4,273,855 and 4,149,892, U.S. Published patent application No. B 351,673 and *Research Disclosure* 130 (RD-13024) (February 1975), etc., which are also effective in addition to the above described specific examples.

It is preferred for Y to contain a ballast group.

The ballast group should be an organic ballast group which can render the dye-releasing redox compound containing the ballast group non-diffusible during heat-development too, and is a group which contains a hydrophobic group preferably having 8 to 32 carbon atoms. The organic ballast group can be attached to the dye-releasing redox compound directly or through a linkage; e.g., an imino bond, an ether bond, a thioether bond, a carboxamido bond, a sulfonamido bond, a ureido bond, an ester bond, an imido bond, a carbamoyl bond, a sulfomoyl bond, etc., alone or in combination.

Specific examples of suitable ballast groups include an alkyl group (e.g., a dodecyl group and an octadecyl group), an alkenyl group, an alkoxyalkyl group (e.g., a 3-(octyloxy)propyl group as described in Japanese Patent Publication No. 27563/64 and a 3-(2-ethylundecyloxy)propyl group), an alkylaryl group (e.g., a 4-nonylphenyl group, a 2,4-di-tert-butylphenyl group), an alkylaryloxyalkyl group (e.g., a 2,4-di-tert-pentylphenoxymethyl group, an α-(2,4-di-tert-pentylphenoxy)propyl group, a 1-(3-pentadecylphenoxy)ethyl group, etc.), an acylamidoalkyl group (e.g., those groups described in U.S. Pat. Nos. 3,337,344 and 3,418,129, a 2-(N-butylhexadecanamido)ethyl group, etc.) and alkoxyaryl group and an aryloxyaryl group (e.g., a 4-(n-octadecyloxy)phenyl group, a 4-(4-n-dodecylphenyloxy)phenyl group, etc.), an alkyl group or an alkenyl group having a long chain fatty acid group and a water solubilizing group such as a carboxy group or a sulfo group (e.g., a 1-carboxymethyl-2-nonadecenyl group, a 1-sulfoheptadecyl group, etc.), an alkyl group substituted with an ester group (e.g., a 1-ethoxycarbonylheptadecyl group, a 2-(n-dodecyloxycarbonyl)ethyl group, etc.), alkyl group substituted with an aryl group or a heterocyclic group (e.g., a 2-[4-(3-methoxycarbonyluneicosanamido)phenyl]ethyl group, a 2-[4-(2-n-octadecylsuccinimido)phenyl]ethyl group, etc.) and an aryl group substituted with an aryloxyalkoxycarbonyl group (e.g., a 4-[2-(2,4-di-tert-pentylphenyloxy)-2-methylprpyloxycarbonyl]phenyl group, etc.)

Specific examples of preferred dye releasing redox compounds which can be used in this invention are described below. However, the present invention is not to be construed as being limited to these examples.

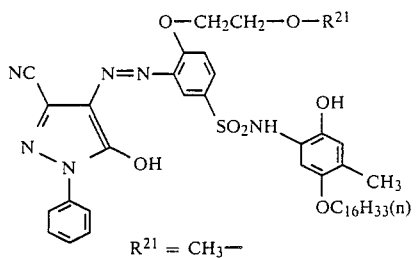

Compound 1

In the formula of Compound 1
$R^{21} = C_2H_5-$

Compound 2

$R^{21} = CH_3-$

-continued
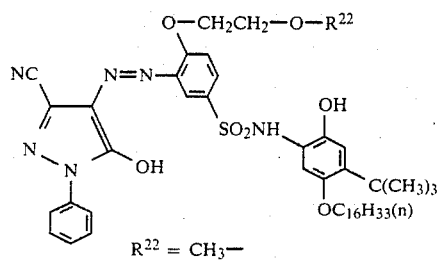
Compound 3  In the formula of Compound 3
$R^{22} = CH_3-$   $R^{22} = C_2H_5-$
Compound 4
In the formula of Compound 3
$R^{22} = H-$
Compound 5
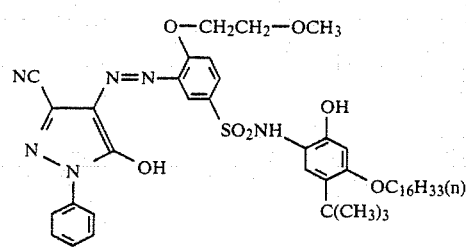
Compound 6
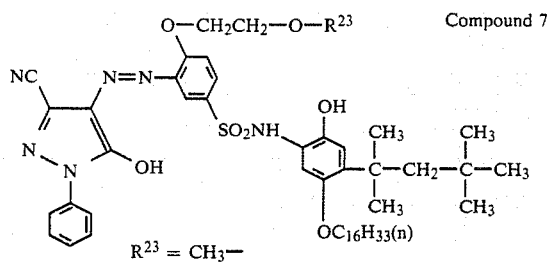
Compound 7  In the formula of Compound 7
$R^{23} = CH_3-$   $R^{22} = C_2H_5-$
Compound 8
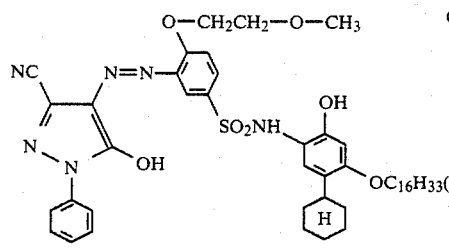
Compound 9
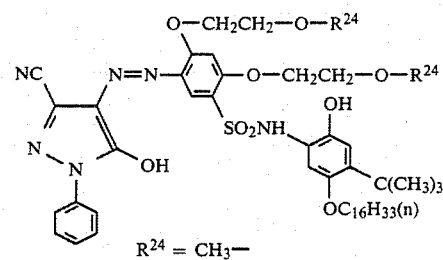
Compound 10
$R^{24} = CH_3-$
In the formula of Compound 10
$R^{24} = C_2H_5-$
Compound 11
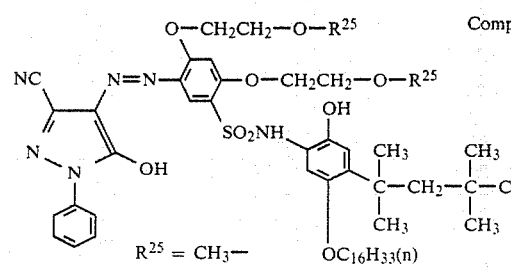
Compound 12
$R^{25} = CH_3-$ -continued
In the formula of Compound 12
$R^{25} = C_2H_5-$
Compound 13
Compound 14
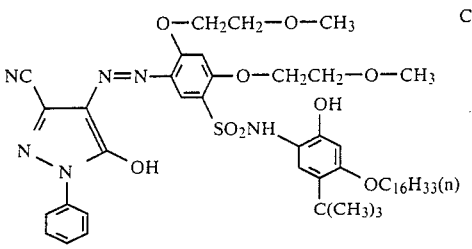
Compound 15
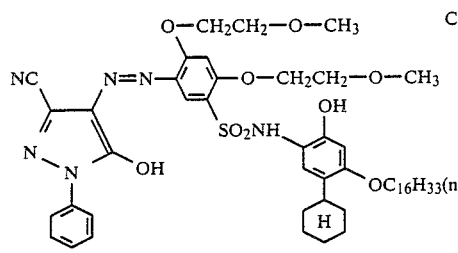
Compound 16
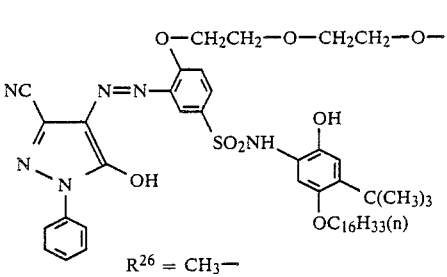
$R^{26} = CH_3-$
In the formula of Compound 16
$R^{26} = C_2H_5-$
Compound 17
Compound 18
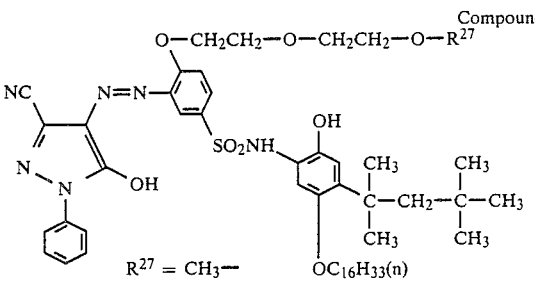
$R^{27} = CH_3-$
In the formula of Compound 18
$R^{27} = C_2H_5-$
Compound 19
Compound 20
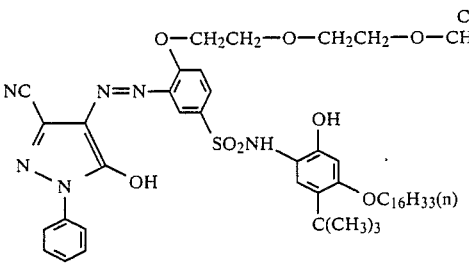
Compound 21
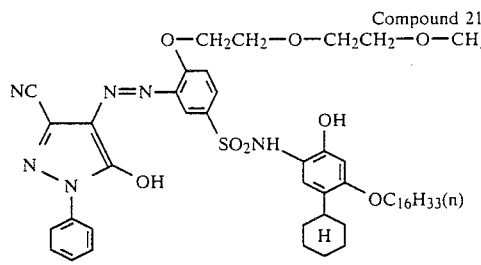
Compound 22
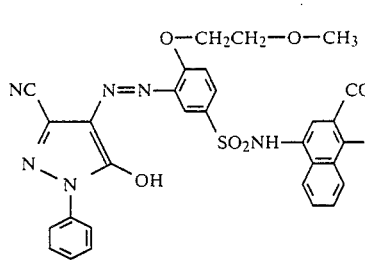

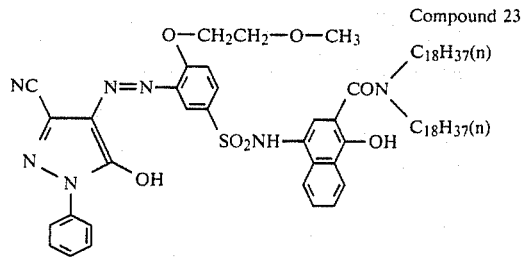

Compound 23

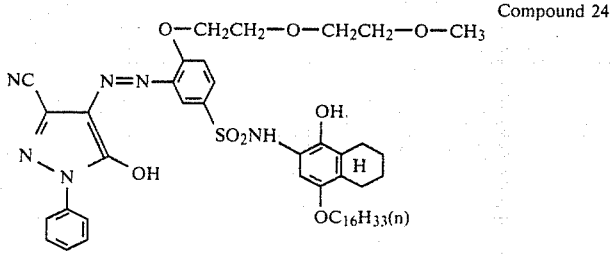

Compound 24

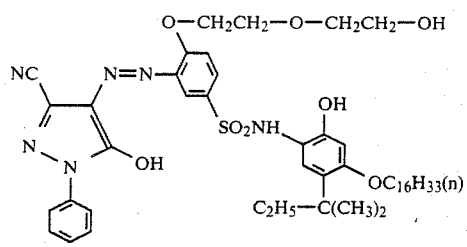

Compound 25

Compound 26 In the formula of Compound 1 $R^{21} = C_3H_7-$

Upon oxidation, the dye-releasing redox compounds used in the present invention a yellow dye of the formula (A) below.

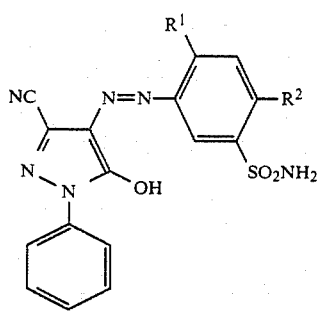

(A)

wherein $R^1$ and $R^2$ have the same meanings as defined in the general formula (X).

The redox compound used in the present invention can be prepared by condensation reaction between a compound of the formula (B).

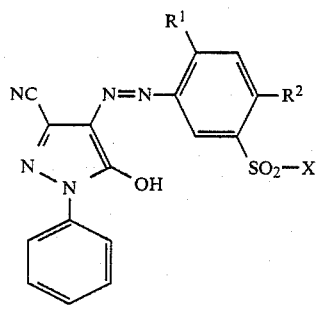

(B)

wherein $R^1$ and $R^2$ have the same meanings as defined in the general formula (X) and X represents a halogen atom (e.g., a chlorine atom and a fluorine atom), with a sulfonyl halide of the formula (C), $Y-NH_2$ (C)

wherein Y has the same meaning as defined in the general formula (I).

Synthesis of the sulfonyl halide having a substituted alkoxy group represented by the formula (B) can be carried out in a manner similar to that described in Japanese Patent Application (OPI) No. 111344/79.

For example, a compound of the formula (B) in which $R^2$ represents a hydrogen atom can be prepared using the following schematic.

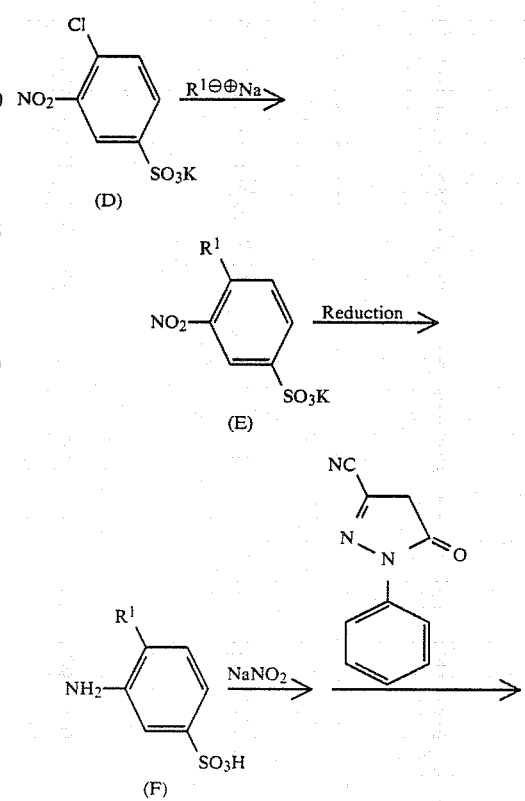

-continued

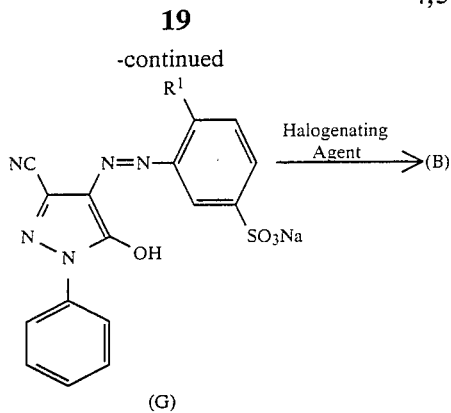

R¹ in the above formula has the same meaning as defined in the general formula (I).

Representative synthesis examples of dye releasing redox compounds which can be used in the present invention and of intermediate thereof are described below. Unless otherwise indicated herein, all parts, percents, ratios and the like are by weight.

SYNTHESIS EXAMPLE 1

Synthesis of Compound 7

(a) Synthesis of Potassium 3-Nitro-4-(2-Methoxyethoxy)Benzenesulfonate

Potassium 3-nitro-4-chlorobenzensulfonate (47.2 g (0.17 moles)) and manganese dioxide (15 g) were added to a mixed solvent of 500 ml of methyl Cellosolve and 75 ml of water and the resulting mixture was heated at a temperature of 65° to 70° C. with stirring. The mixture was admixed with 17.5 ml of an aqueous solution of 17.5 g (0.44 moles) of sodium hydroxide diluted with 50 ml of methyl Cellosolve, and the reaction was continued for another 50 minutes. After completion of the reaction, while the reaction mixture was sitll hot, insoluble matter was removed by filtration with sellaite. Isopropyl alcohol (750 ml) and toluene (1,250 ml) were added to the filtrate and crystals which separated out were collected by filtration, washed with isopropyl alcohol and dried.

Yield: 28.4 g (53%).

(b) Synthesis of 3-Amino-4-(2-Methoxyethoxy)benzenesulfonic Acid

A mixture of 40 g of reduced iron, 1 g of ammonium chloride, 30 ml of water and 50 ml of isopropyl alcohol was heated to 50° C. with stirring. The nitro compound obtained in (a) above was added to the reaction mixture, which was then refluxed for 30 minutes. The reaction mixture was filtered with sellaite, while it was hot, to remove insoluble matter. Hydrochloric acid (12 ml) was added to the filtrate and the mixture was cooled with ice. Crystals which separated out were collected, washed with cold water and dried.

Yield: 12.6 g (75%).

(c) Synthesis of 3-Cyano-4-(2-Methoxyethoxy-5-Sulfophenylazo)-1-Phenyl-5-Pyrazolone A mixture of 11 g (0.045 mmoles) of the amino compound obtained in (b) above and 50 ml of an aqueous solution having dissolved therein 8.4 ml of hydrochloric acid was cooled to a temperature of 0° to 5° C. and 16 ml of an aqueous solution having dissolved therein 3.4 g of sodium nitrite was added dropwise to the mixture with stirring. After completion of the addition, the mixture was stirred for 1 hour at a temperature of 0° to 5° C. to prepare a diazo solution. The diazo solution was added dropwise to a mixture of 7.8 g (0.042 moles) of 3-cyano-1-phenyl-5-pyrazolone, 16.4 g of sodium acetate, 50 ml of methanol and 50 ml of water at a temperature of not higher than 10° C. After completion of the addition, the resulting mixture was stirred at a temperature of 5° to 10° C. for 1 hour. Crystals which separated out were collected, washed with cold water and with acetonitrile, and dried.

Yield: 18.6 g (96%).

(d) Synthesis of 3-Cyano-4-(2-Methoxyethoxy-5-Chloro-Sulfonyl-phenylazo)-1-Phenyl-5-Pyrazolone N,N-Dimethylacetamide (14 ml) and then phosphorus oxychloride (14 ml) were added dropwise to a suspension of 17.6 g (0.038 moles) of the sodium sulfonate compound obtained in (c) above. After completion of the addition, the resulting mixture was stirred at 60° C. for 2 hours. After completion of the stirring, the reaction mixture was added to 250 ml of ice water, and crystals which separated out were collected, washed with water and dried.

Yield: 16.6 g (94%).

(e) Synthesis of Compound 7

The sulfonyl chloride compound obtained in (d) above (11.8 g (0.026 moles)) was added to 70 ml of an acetamide solution having dissolved therein 15 g of 2-amino-4-hexadecyloxy-5-(1,1,3,3-tetramethylbutyl)-phenol p-toluenesulfonate and 7.5 ml of pyridine while bubbling $N_2$ thereinto and the mixture was stirred at room temperature for 1 hour and then at 50° C. for 30 minutes. After completion of the reaction, 150 ml of ethyl acetate and 125 ml of an aqueous solution of 4% sodium bicarbonate both of which were warmed to 50° C. were added to the reaction mixture, and the aqueous layer was decanted. An aqueous solution of 4% sodium bicarbonate (100 ml) warmed to 50° C. was added to the remaining ethyl acetate layer, and the aqueous layer was decanted. Then, 300 ml of methanol was added to the ethyl acetate layer, and the mixture was cooled with ice. Crystals which separated out were filtered, washed with methanol and dried to obtain Compound 7.

Yield: 16.6 g (79%).
m.p. 137°–139° C.

SYNTHESIS EXAMPLE 2

Synthesis of Compound 3

A condensation reaction was carried out in a manner similar to Synthesis Example 1(e) except that 2-amino-4-hexadecyloxy-5-(1,1,3,3-tetramethylbutyl)phenol p-toluenesulfonate was replaced by 2-amino-4-hexadecyloxy-5-tert-butylphenol hydrochloride, followed by purification procedures similar to those used in Synthesis Example 1(e) to obtain Compound 3.

m.p. 160°–162° C.

SYNTHESIS EXAMPLE 3

Synthesis of Compound 6

A condensation reaction was carried out in a manner similar to Synthesis Example 1(e) except that 2-amino-4-hexadecyloxy-5-(1,1,3,3-tetramethylbutyl)phenol p-toluenesulfonate was replaced by 2-amino-5-hexadecyloxy-4-tert-butylphenol hydrochloride followed by purification procedures similar to those used in Synthesis Example 1(e) to obtain Compound 6.
m.p. 214°–219° C.

SYNTHESIS EXAMPLE 4

Synthesis of Compound 12

(a) Synthesis of 2,4-Dichloro-5-Nitrobenzenesulfonic Acid 2,4-Dichloronitrobenzene (122 g (0.635 moles)) in 20% fuming sulfuric acid was heated at a temperature of 120° C. to 130° C. for 5 hours with stirring. After completion of the reaction, the reaction mixture was added portionwise to 1.5 l of ice water. The resulting aqueous solution was warmed to 50° C. and 400 g of NaCl was added thereto followed by cooling to room temperature. Crystals which separated out were collected by filtration, washed with water and with acetonitrile and dried.
Yield: 162.4 g (94%).

(b) Synthesis of Sodium 2,4-Di(2-Methoxyethoxy)-5-Nitrobenzenesulfonate

To 300 ml of methyl Cellosolve was portionwise added 19.2 g of a 50% liquid paraffin suspension of sodium hydride (0.4 moles) to prepare an alcoholate solution. The sulfonic acid compound obtained in (a) above (27.2 g (0.1 mole)) was added to the alcoholate solution and the mixture was stirred at a temperature of 50° to 55° C. for 3 hours. After completion of the reaction, 50 ml of warm water (50° C.) was added to the reaction mixture, and insoluble matter was removed by filtration with sellaite. The filtrate was admixed with 450 ml of isopropyl alcohol and 800 ml of toluene and the mixture was ice cooled. Crystals which separated out were collected by filtration, washed with toluene and dried.
Yield: 28.5 g (76%).

(c) Synthesis of 3-Cyano-4-(2,4-Dimethoxyethoxy-5-Sulfophenylazo)-1-Phenyl-5-Pyrazolone The nitro compound obtained in (b) above (28 g (0.075 moles)) was admixed with 400 ml of methanol and 65 ml of water. Further, a suspension of 0.5 g of 10% palladium carbon in 20 ml of methyl Cellosolve was added to the mixture. The resulting mixture was stirred at 30° C. for 3 hours in a 1 l autoclave under a hydrogen pressure of 51 kg/cm$^2$. After completion of the reaction, the reaction mixture was allowed to cool to room temperature, with the hydrogen pressure then being 39 kg/cm$^2$. After the catalyst was removed by filtration with sellaite, the solvent was concentrated. The concentrate was used as a starting material for the subsequent diazo coupling stop without isolating the corresponding amino compound which formed.

The concentrate of the amino compound (about 100 ml) was admixed with 20 ml of hydrochloric acid and cooled to a temperature of 0° to 5° C. An aqueous solution of 5.4 g (0.079 moles) of sodium nirite (40 ml) was added dropwise to the mixture. After completion of the addition, the mixture was stirred at a temperature of 0° to 5° C. for 1 hour to prepare a diazo solution. The diazo solution was added dropwise to a mixture of 13.1 g (0.07 moles) of 3-cyano-1-phenyl-5-pyrazolone, 71.6 g of sodium acetate and 200 ml of methanol at 10° C. After completion of the addition, the mixture was stirred at a temperature of 5° to 10° C. for 1 hour. Crystals which separated out were collected, washed with cold water and with acetonitrile and dried.
Yield: 33 g (81% based on the nitro compound obtained in (b) above).

(d) Synthesis of 3-Cyano-4-(2,4-Dimethoxyethoxy-5-Chlorosulfonylphenylazo)-1-Phenyl-5-Pyrazolone N,N-Dimethylacetamide (22 ml) and then phosphorus oxychloride (22 ml) were added dropwise to a suspension of 33 g (0.61 moles) of the sodium sulfonate compound obtained in (c) above in 160 ml of acetonitrile. After completion of the addition, the mixture was stirred at a temperature of 50° to 60° C. for 3 hours. After completion of the reaction, the reaction mixture was added to 400 ml of ice water. Crystals which separated out were collected by filtration, washed with water and dried.
Yield: 27.5 g (84%)

(e) Synthesis of Compound 12

The sulfonyl chloride compound obtained in (d) above (14.5 g (0.027 moles)) was added to 70 ml of an acetamide solution having dissolved therein 15.9 g of 2-amino-4-hexadecyloxy-5-(1,1,3,3-tetramethylbutyl)-phenol p-toluenesulfonate and 7.5 ml of pyridine while bubbling N$_2$ thereinto and the mixture was stirred at room temperature for 1 hour and then at 50° C. for 30 minutes. After completion of the reaction, 200 ml of ethyl acetate and 150 ml of an aqueous solution of 4% sodium bicarbonate both of which were warmed to 50° C. were added to the reaction mixture, and the aqueous layer was decanted. An aqueous solution of 4% sodium bicarbonate (150 ml) warmed to 50° C. was added to the remaining ethyl acetate layer and the aqueous layer was decanted. Then, 300 ml of methanol warmed to 50° C. was added to the ethyl acetate layer, and the mixture was cooled with ice. Crystals which separated out were filtered, washed with methanol and dried to obtain Compound 12.
Yield: 17.7 g (74%).
m.p. 155°–159° C.

The dye releasing redox compounds are suitably used in a range from about 10 mg/m$^2$ to about 15 g/m$^2$ and preferably in a range from 20 mg/m$^2$ to 10 g/m$^2$ in a total.

The dye releasing redox compound of the formula (I) used in the present invention can be introduced into a layer of the light-sensitive material using known methods such as a method as described in U.S. Pat. No. 2,322,027. In this case, an organic solvent having a high boiling point or an organic solvent having a low boiling point as described below can be used. For example, the dye releasing redox compound can be dispersed in a hydrophilic colloid after it is dissolved in an organic solvent having a high boiling point, for example, a phthalic acid alkyl ester (for example, dibutyl phthalate, dioctyl phthalate, etc.), a phosphoric acid ester (for example, diphenyl phosphate, triphenyl phosphate, tricresyl phosphate, dioctylbutyl phosphate, etc.), a citric acid ester (for example, tributyl acetylcitrate, etc.), a benzoic acid ester (for example, octyl benzoate, etc.), an alkylamide (for example, diethyl lauryl amide, etc.), an aliphatic acid ester (for example, dibutoxyethyl succinate, dioctyl azelate, etc.), a trimesic acid ester (for example, tributyl trimesate, etc.), etc., or an organic solvent having a low boiling point of about 30° to 160° C., for example, a lower alkyl acetate such as ethyl acetate, butyl acetate, etc., ethyl propionate, secondary butyl alcohol, methyl isobutyl ketone, β-ethoxyethyl acetate, methyl cellosolve acetate, cyclohexanone, etc. The above-described organic solvents having a high boiling point and organic solvents having a low boiling point may be used as a mixture thereof, if desired.

Further, it is possible to use a dispersion method employing a polymer as described in Japanese Patent Publication No. 39853/76 and Japanese Patent Application (OPI) No. 59943/76. Moreover, various surface active agents can be used when the dye releasing redox compound is dispersed in a hydrophilic colloid. For this purpose, the surface active agents illustrated hereinafter in the specification can be used.

In the present invention, if desired, a reducing agent may also be used. The reducing agent in this case is the so-called auxiliary developing agent, which is oxidized by the silver halide and/or the organic silver salt oxidizing agent to form an oxidized product having the ability to oxidize the reducing group Y in the dye releasing redox compound of the general formula (I).

Examples of useful auxiliary developing agents include the compounds specifically described in European Patent Application (OPI) No. 76,492.

Suitable reducing agents which can be used in the present invention include the following compounds: hydroquinone compounds (for example, hydroquinone, 2,5-dichlorohydroquinone, 2-chlorohydroquinone, etc.), aminophenol compounds (for example, 4-aminophenol, N-methylaminophenol, 3-methyl-4-aminophenol, 3,5-dibromoaminophenol, etc.), catechol compounds (for example, catechol, 4-cyclohexylcatechol, 3-methoxycatechol, 4-(N-octadecylamino)catechol, etc.), phenylenediamine compounds (for example, N,N-diethyl-p-phenylenediamine, 3-methyl-N,N-diethyl-p-phenylenediamine, 3-methoxy-N-ethyl-N-ethoxy-p-phenylenediamine, N,N,N',N'-tetramethyl-p-phenylenediamine, etc.).

Various combinations of developing agents as described in U.S. Pat. No. 3,039,869 can also be used.

In the present invention, the amount of the reducing agent which can be employed is from 0.01 mol to 20 mols per mol of silver and more preferably from 0.1 mol to 10 mols per mol of silver.

The silver halide used in the present invention can be silver chloride, silver chlorobromide, silver chloroiodide, silver bromide, silver iodobromide, silver chloroiodobromide and silver iodide, etc.

In the embodiment of the present invention in which the organic silver salt oxidizing agent is not used together with but the silver halide is used alone, particularly preferred silver halide is silver halide partially containing a silver iodide crystal in the particles. That is, a silver halide in which the X-ray diffraction pattern shows that of pure silver iodide is particularly preferred.

In photographic materials a silver halide containing two or more kinds of halogen atoms can be used. Such a silver halide yields a completely mixed crystal in a conventional silver halide emulsion. For example, the particles of silver iodobromide show an X-ray diffraction pattern at a position corresponding to the mixed ratio of silver iodide crystal and silver bromide crystal but not at a position corresponding to pure silver iodide crystal and pure silver bromide crystal separately.

Particularly preferred examples of silver halides which can be used in the present invention include silver chloroiodide, silver iodobromide, and silver chloroiodobromide each containing silver iodide crystals in the particles thereof and showing X-ray diffraction pattern of silver iodide crystals.

The process for preparing those silver halides using silver iodobromide as exemplary. That is, silver iodobromide is prepared by first adding a silver nitrate solution to a potassium bromide solution to form silver bromide particles and then adding potassium iodide to the mixture.

Two or more kinds of silver halides in which the particle size and/or a halogen composition are different from each other may be used in admixture, if desired.

The average particle size of the silver halide used in the present invention is preferably from about 0.001 μm to about 10 μm and more preferably from 0.001 μm to 5 μm.

The silver halide used in the present invention may be used as is. However, the silver halide may also be chemically sensitized with a chemical sensitizing agent such as compounds of sulfur, selenium or tellurium, etc., or compounds of gold, platinum, palladium, rhodium or iridium, etc., a reducing agent such as tin halide, etc., or a combination thereof. The details thereof are described in T. H. James, *The Theory of the Photographic Process*, the Fourth Edition, Chapter 5, pages 149 to 169.

In a particularly preferred embodiment of the present invention, an organic silver salt oxidizing agent is also used. The organic silver salt oxidizing agent is a silver salt which forms a silver image upon reaction with the above-described image forming substance or a reducing agent which are copresent, if desired, with the image forming substance, when it is heated to a temperature of above about 80° C. and, preferably, above 100° C. in the presence of exposed silver halide. Due to the copresence of the organic silver salt oxidizing agent, a light-sensitive material which provides higher color density can be obtained.

The silver halide used in this case need not always have the characteristic that the silver halide contains pure silver iodide crystals in the case of using the silver halide alone. Any silver halide which is known in the art can be used.

Examples of such organic silver salt oxidizing agents include those described in European Patent Application (OPI) No. 76,492.

A silver salt of an organic compound having a carboxy group can be used. Typical examples thereof include a silver salt of an aliphatic carboxylic acid and a silver salt of an aromatic carboxylic acid.

In addition, a silver salt of a compound containing a mercapto group or a thione group and a derivative thereof can be used.

Further, a silver salt of a compound containing an imino group can be employed. Suitable examples of these compounds include a silver salt of benzotriazole and the derivatives thereof as described in Japanese Patent Publication Nos. 30270/69 and 18416/70, for example, a silver salt of benzotriazole, a silver salt of alkyl-substituted benzotriazole such as a silver salt of methylbenzotriazole, etc., a silver salt of a halogen-substituted benzotriazole such as a silver salt of 5-chlorobenzotriazole, etc., a silver salt of carboimidobenzotriazole such as a silver salt of butylcarboimidobenzotriazole, etc., a silver salt of 1,2,4-triazole or 1-H-tetrazole as described in U.S. Pat. No. 4,220,709, a silver salt of carbazole, a silver salt of saccharin, a silver salt of imidazole and an imidazole derivative, and the like.

Moreover, a silver salt as described in *Research Disclosure*, Vol. 170, No. 17029 (June, 1978) and an organic metal salt such as copper stearate, etc., are organic metal salt oxidizing agents capable of being used in the present invention.

Methods of preparing these silver halide and organic silver salt oxidizing agents and techniques of blending them are described in *Research Disclosure*, No. 17029, Japanese Patent Application (OPI) Nos. 32928/75 and 42529/76, U.S. Pat. No. 3,700,458, and Japanese Patent Application (OPI) Nos. 13224/74 and 17216/75.

A suitable coating amount of the light-sensitive silver halide and the organic silver salt oxidizing agent employed in the present invention is in a total of from 50 mg/m$^2$ to 10 g/m$^2$ calculated as silver.

The light-sensitive silver halide and the organic silver salt oxidizing agent used in the present invention are prepared in the binder as described below. Further, the dye releasing redox compound used in the present invention is dispersed in the binder described below.

The binder which can be used in the present invention can be employed alone or as a combination thereof. A hydrophilic binder can be used as the binder according to the present invention. Typical hydrophilic binders are transparent or translucent hydrophilic colloids, examples of which include natural substances, for example, a protein such as gelatin, a gelatin derivative, a cellulose derivative, etc., a polysaccharide such as starch, gum arabic, etc., and a synthetic polymer, for example, a water-soluble polyvinyl compound such as polyvinyl alcohol, polyvinyl pyrrolidone, acrylamide polymer, etc. Another example of a synthetic polymer compound is a dispersed vinyl compound in a latex form which is used for the purpose of increasing the dimensional stability of the photographic material.

The silver halide used in the present invention can be spectrally sensitized with methine dyes or other dyes. Suitable dyes which can be employed include cyanine dyes, merocyanine dyes, complex cyanine dyes, complex merocyanine dyes, holopolar cyanine dyes, hemicyanine dyes, styryl dyes, and hemioxonol dyes. Of these dyes, cyanine dyes, merocyanine dyes and complex merocyanine dyes are particularly useful. Any conventionally utilized nucleus for cyanine dyes, such as basic heterocyclic nuclei, can be employed in these dyes. That is, a pyrroline nucleus, an oxazoline nucleus, a thiazoline nucleus, a pyrrole nucleus, an oxazole nucleus, a thiazole nucleus, a selenazole nucleus, an imidazole nucleus, a tetrazole nucleus, a pyridine nucleus, etc., and further, nuclei formed by condensing alicyclic hydrocarbon rings with these nuclei and nuclei formed by condensing aromatic hydrocarbon rings with these nuclei, that is, an indolenine nucleus, a benzindolenine nucleus, an indole nucleus, a benzoxazole nucleus, a naphthoxazole nucleus, a benzothiazole nucleus, a naphthothiazole nucleus, a benzoselenazole nucleus, a benzimidazole nucleus, a quinoline nucleus, etc., are appropriate. The carbon atoms of these nuclei may also be substituted, if desired.

Suitable merocyanine dyes and complex merocyanine dyes are those having nuclei with a ketomethylene structure, 5- or 6-membered heterocyclic nuclei such as a pyrazolin-5-one nucleus, a thiohydantoin nucleus, a 2-thiooxazolidin-2,4-dione nucleus, a thiazolidin-2,4-dione nucleus, a rhodanine nucleus, a thiobarbituric acid nucleus, etc.

These sensitizing dyes can be employed alone, and can also be employed as a combination thereof. A combination of sensitizing dyes is often used, particularly for the purpose of supersentitization. Representative examples thereof are described in U.S. Pat. Nos. 2,688,545, 2,977,229, 3,397,060, 3,522,052, 3,527,641, 3,617,293, 3,628,964, 3,666,480, 3,672,898, 3,679,428, 3,703,377, 3,769,301, 3,814,609, 3,837,862 and 4,026,707, British Pat. Nos. 1,344,281 and 1,507,803, Japanese Patent Publication Nos. 4936/68 and 12375/78, Japanese Patent Application (OPI) Nox. 110618/77 and 109925/77, etc.

The sensitizing dyes may be present in the emulsion together with dyes which themselves do not provide spectrally sensitizing effects but exhibit a supersentitizing effect or materials which do not substantially absorb visible light but exhibit a supersentitizing effect. For example, aminostilbene compounds substituted with a nitrogen-containing heterocyclic group (e.g., those described in U.S. Pat. Nos. 2,933,390 and 3,635,721), aromatic organic acid-formaldehyde condensates (e.g., those described in U.S. Pat. No. 3,743,510), cadmium salts, azaindene compounds, etc., can be employed. The combinations described in U.S. Pat. Nos. 3,615,613, 3,615,641, 3,617,295 and 3,635,712 are particularly useful.

Suitable supports used in the light-sensitive material and the dye fixing material employed, if desired, according to the present invention are supports which can endure the processing temperature. As ordinary support, such as glass, paper, metal or analogues thereof may be used, but also an acetyl cellulose film, a cellulose ester film, a polyvinyl acetal film, a polystyrene film, a polycarbonate film, a polyethylene terephthalate film, and a film related thereto or a synthetic resin material may be used. Further, a paper support laminated with a polymer such as polyethylene, etc., can be used. The polyesters described in U.S. Pat. Nos. 3,634,089 and 3,725,070 are preferably used.

In the present invention, various kinds of dye releasing activators can be used. A dye releasing activator is a substance which accelerates the ocidation-reduction reaction between the light-sensitive silver halide and/or the organic silver salt oxidizing agent and dye releasing redox compound or accelerates release of a dye due to its nucleophilic action on the ozidized dye releasing redox compound in the dye releasing reaction which subsequently occurrs, and a base and a base precursor can be used. It is particularly advantageous to use dye releasing activators in order to accelerate the reactions in the present invention.

Examples of preferred bases are amines which include trialkylamines, hydroxylamines, aliphatic polyamines, N-alkyl substituted aromatic amines, N-hydroxyalkyl substituted aromatic amines and bis[p-(dialkylamino)phenyl]methanes. Further, betaine tetramethylammonium iodide and diaminobutane dihydrochloride as described in U.S. Pat. No. 2,410,644, and urea and organic compounds including amino acids such as 6-aminocaproic acid as described in U.S. Pat. No. 3,506,444 can be used. A base precursor is a substance which releases a basic component upon heating. Examples of typical base precursors are described in British Pat. No. 998,949. A preferred based precursor is a salt of a carboxylic acid and an organic base, and examples of suitable carboxylic acids include trichloroacetic acid and trifluoroacetic acid and examples of suitable bases include guanidine, piperidine, morpholine, p-toluidine and 2-picoline, etc. Guanidine trichloroacetate as described in U.S. Pat. No. 3,220,846 is particularly preferred. Further, aldonic amides as described in Japanese Patent Application (OPI) No. 22625/75 are preferably used because they decompose at a high temperature to form bases.

These dye releasing activators can be used in a broad range of amounts. A useful range is up to above 50% by weight based on the weight of a dry layer coated of the light-sensitive material. A range of 0.01% by weight to 40% by weight is more preferred.

It is advantageous to use a compound represented by the general formula described below in the heat-developable color photographic material in order to accelerate development and accelerate release of a dye.

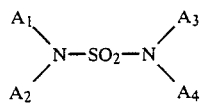

wherein $A_1$, $A_2$, $A_3$ and $A_4$, which may be the same or different, each represents a hydrogen atom or a substituent selected from the group consisting of an alkyl group, a substituted alkyl group, a cycloalkyl group, an aralkyl group, an aryl group, substituted aryl group and a heterocyclic group; and $A_1$ and $A_2$ or $A_3$ and $A_4$ may combine with each other to form a ring.

The above-described compound can be used in abroad range of amounts. A useful range is up to about 20% by weight based on the weight of a dry layer coated of the light-sensitive material. A range of 0.1% by weight to 15% by weight is more preferred.

It is advantageous to use a water releasing compound in the present invention in order to accelerate the dye releasing reaction.

The water releasing compound means a compound which releases water upon decomposition during heat development. These compounds are particularly known in the field of printing of fabrics, and $NH_4Fe(SO_4)_2 \cdot 12H_2O$, etc., as described in Japanese Patent Application (OPI) No. 88386/75 are useful.

Further, in the present invention, it is possible to use a compound which activates development simultaneously while stabilizing the image. Particularly, isothiuroniums including 2-hydroxyethylisothiuronium trichloroacetate as described in U.S. Pat. No. 3,301,678, bisisothiuroniums including 1,8-(3,6-dioxaoctane)-bis-(isothiuronium trifluoroacetate), etc., as described in U.S. Pat. No. 3,669,670, thiol compounds as described in German Patent Application (OLS) No. 2,162,714, thiazolium compounds such as 2-amino-2-thiazolium trichloroacetate, 2-amino-5-bromoetyl-2-thiazolium trichloroacetate, etc. as describee in U.S. Pat. No. 4,012,260, compounds having α-sulfonylacetate as an acid moiety such as bis(2-amino-2-thiazolium)-methylenebis(sulfonylacetate), 2-amino-2-thiazolium phenylsulfonylacetate, etc., as described in U.S. Pat. No. 4,060,420, and compounds having 2-carboxycarboxamide as an acid part as described in U.S. Pat. No. 4,088,496 are preferred for use.

In the present invention, it is possible to use a thermal solvent. The term "thermal solvent" means a nonhydrolyzable organic material which is solid at ambient temperature but melts together with the other components at a temperature of the heat treatment or below. Preferred examples of thermal solvents include compounds acting as a solvent for the developing agent and compounds having a high dielectric constant which accelerate physical development of silver salts. Examples of preferred thermal solvents include those described in European Patent Application (OPI) No. 76,492.

In the present invention, though it is not very necessary to further incorporate substances or dyes for preventing irradiation or halation in the light-sensitive material, because the light-sensitive material is colored by the dye releasing redox compound, it is possible to use filter dyes or light absorbing materials, etc., as described in Japanese Patent Publication No. 3692/73 and U.S. Pat. Nos. 3,253,921, 2,527,583 and 2,956,879, etc., in order to further improve the sharpness. Preferably these dyes have a thermal bleaching property. For example, the dyes as described in U.S. Pat. Nos. 3,769,019, 3,745,009 and 3,615,432 are preferred.

The light-sensitive material of the present invention may contain, if desired, various additives known for heat-developable light-sensitive materials and may include a layer other than the light-sensitive layer, for example, an antistatic layer, an electrically conductive layer, a protective layer, an intermediate layer, an antihalation layer, a strippable layer, etc.

The photographic emulsion layer and other hydrophilic colloid layers in the light-sensitive material of the present invention may contain various surface active agents for various purposes, for example, as coating aids or for prevention of electrical charging, improvement of lubricating property, emulsification, prevention of adhesion, improvement of photographic properties (for example, acceleration of development, providing a hard tone or sensitization), etc.

For example, nonionic surface active agents such as saponin (steroid), alkylene oxide derivatives (for example, polyethylene glycol, polyethylene glycol/polypropylene glycol condensates, polyethylene glycol alkyl ethers or polyethylene glycol alkylaryl ethers, polyethylene glycol esters, polyethylene glycol sorbitan esters, polyalkylene glycol alkylamine or amides, polyethylene oxide adducts of silicone, etc.), glycidol derivatives (for example, alkenylsuccinic acid polyglycerides, alkylphenol polyglycerides, etc.), polyhydric alcohol aliphatic acid esters or saccharide alkyl esters, etc., anionic surface active agents containing acid groups such as a carboxy group, a sulfo group, a phospho group, a sulfate group, a phosphate group, etc., such as alkylcarboxylic acid salts, alkylsulfonic acid salts, alkylbenzenesulfonic acid salts, alkylnaphthalenesulfonic acid salts, alkyl sulfuric acid esters, alkylphosphoric acid esters, N-acyl-N-alkyltaurines, sulfosuccinic acid esters, sulfoalkyl polyoxyethylene alkylphenyl ethers, polyoxyethylene alkylphosphoric acid esters, etc.; ampholytic surface active agents such as amino acids, aminoalkylsulfonic acids, aminoalkylsulfuric acid esters or phosphoric acid esters, alkylbetaines, amine oxides, etc.; and cationic surface active agents such as alkylamine salts, aliphatic or aromatic quaternary ammonium salts, heterocyclic quaternary ammonium slats such as pyridinium salts, imidazolium salts, etc., aliphatic or heterocyclic phosphonium salts, aliphatic or heterocyclic solfonium salts, etc. can be used.

Of the above-described surface active agents, polyethylene glycol type nonionic sufface active agents having ethylene oxide recurring unit in their structure are preferably incorporated into the light-sensitive material. It is particularly preferred for the structure to contains 5 or more of ethylene oxide recurring units.

The nonionic sufface active agents capable of satisfying the above-described conditions are well known as to their structures, properties and methods of synthesis. These nonionic sufface active agents are widely used even outside this field. Representative references describing these agents include: *Surfactant Science Series*, Vol. 1, Nonionic Surfactants (edited by Martin J. Schick, Marcel Dekker Inc., 1967), and *Surface Active Ethylene Oxide Adducts* (edited by Schoufeldt N. Pergamon Press, 1969). Suitable nonionic surface active agents described in the above-mentioned references, are those capable of satisfying the above-described conditions and they are preferably employed in connection with the present invention.

The nonionic surface active agents can be used alone or as a mixture of two or more thereof, if desired.

Polyethylene glycol type nonionic surface active agents can be used in an amount of less than about 100% by weight, preferably less than 50% by weight, based on the weight of hydrophilic binder present.

The light-sensitive material of the present invention may contain a cationic compound containing a pyridinium salt. Examples of cationic compounds containing a pyridinium group which can be used are described in *PSA Journal*, Section B 36 (1953), U.S. Pat. Nos. 2,648,604 and 3,671,247, Japanese Patent Publication Nos. 30074/69 and 9503/69, etc.

The photographic emulsion layer and other binder layers of the photographic light-sensitive material and the dye fixing material of the present invention may contain inorganic or organic hardeners. Chromium salts (chromium alum, chromium acetate, etc.), aldehydes (formaldehyde, glyoxal, glutaraldehyde, etc.), N-methylol compounds (dimethylolurea, methylol dimethylhydantoin, etc.), dioxane derivatives (2,3-dihydroxydioxane, etc.), active vinyl compounds (1,3,5-triacryloylhexahydro-s-triazine, 1,3-vinylsulfonyl-2-propanol, etc.), active halogen compounds (2,4-dichloro-6-hydroxy-s-triazine, etc.), mucohalogenic acids (mucochloric acid, mucophenoxychloric acid, etc.), etc., can be used alone or as a combination thereof.

Examples of various additives include those described in *Research Disclosure*, Vol. 170, No. 17029 (June, 1978), for example, plasticizers, dyes for improving shapness, antihalation dyes, sensitizing dyes, matting agents, fluorescent whitening agents and fading preventing agent, etc.

If desired, two or more layers may be coated at the same time by the method as described in U.S. Pat. No. 2,761,791 and British Pat. No. 837,095.

Various means of exposure can be used in the present invention. Latent images are obtained by imagewise exposure to radiant light including visible rays. Generally, light sources used for conventional color prints can be used, examples of which include tungsten lamps, mercury lamps, halogen lamps such as iodine lamps, xenon lamps, laser light sources, CRT light sources, fluorescent tubes and light-emitting diodes, etc.

In the present invention, simultaneously with or after the heat-developable color photographic material is exposed to light, the resulting latent image can be developed by heating the entire material to a suitably elevated temperature, for example, about 80° C. to about 250° C. for about 0.5 second to about 300 seconds. A higher temperature or lower temperature can be utilized with heating time, if it is within the above-described temperature range, being prolonged or shortened. Particularly, a temperature range of about 110° C. to about 160° C. is useful.

A simple heat plate, iron, heat roller, heat generator utilizing carbon or titanium white, etc., or analogues thereof may be used as the heating means.

In the present invention, a specific method for forming a color image by heat development comprises transfer of a hydrophilic mobile dye. For this purpose, the heat-developable color photographic material of the present invention comprises a support having thereon a light-sensitive layer (I) containing at least a silver halide, an organic silver salt oxidizing agent, a dye releasing redox compound which is also a reducing agent for the organic silver salt oxidizing agent and a binder, and a dye fixing layer (II) capable of receiving the hydrophilic diffusible dye formed in the light-sensitive layer (I).

The above described light-sensitive layer (I) and the dye fixing layer (II) may be formed on the same support, or they may be formed on different supports, respectively. The dye fixing layer (II) can be stripped off the light-sensitive layer (I). For example, after the heat-developable color photographic material is exposed imagewise to light, it is developed by heating uniformly and thereafter the dye fixing layer (II) or the light-sensitive layer (I) is peeled apart. Also, when a light-sensitive material having the light-sensitive layer coated on a support and a fixing material having the dye fixing layer (II) coated on a support are separately formed, after the light-sensitive material is exposed imagewise to light and uniformly heated, the mobile dye can be transferred to the dye fixing layer (II) by superposing the fixing material on the light-sensitive material.

Further, a method wherein only the light-sensitive layer (I) is exposed imagewise to light and the heated uniformly by superposing the dye fixing layer (II) on the light-sensitive layer (I) can be used.

The dye fixing layer (II) can contqin, for example, a dye mordant in order to fix the dye. In the present invention, various mordants can be used, and polymer mordants are particularly preferred. In addition to the mordants, the dye fixing layer may contain bases, base precursors and thermal solvents as previously discribed. In particular, incorporation of the bases or base precursors into the dye fixing layer (II) is particularly preferred where the light-sensitive layer (I) and the dye fixing layer (II) are formed on different supports.

Polymer mordants which can be used in the present invention are polymers containing secondary and tertiary amino groups, polymers containing nitrogen-containing heterocyclic moieties, polymers with quaternary cation groups thereof, having a molecular weight of from about 5,000 to about 200,000, and particularly from 10,000 to 50,000.

For example, vinylpyridine polymers and vinylpyridinium cation polymers as disclosed in U.S. Pat. Nos. 2,548,564, 2,484,430, 3,148,061 and 3,756,814, etc., polymer mordants capable of cross-linking with gelatin as disclosed in U.S. Pat. Nos. 3,625,694, 3,859,096 and 4,128,538, British Pat. No. 1,277,435, etc., aqueous sol type mordants as disclosed in U.S. Pat. Nos. 3,958,995, 2,721,852 and 2,798,063, Japanese Patent Application (OPI) Nos. 115228/79, 145529/79 and 126027/79, etc., water-insoluble mordants as disclosed in U.S. Pat. No. 3,898,088, etc., reactive mordants capable of forming covalent bonds with dyes used as disclosed in U.S. Pat. No. 4,168,976 (Japanese Patent Application (OPI) No. 13733/79, etc., and mordants disclosed in U.S. Pat. Nos. 3,709,690, 3,788,855, 3,642,482, 3,488,706, 3,557,066, 3,271,147 and 3,271,148, Japanese Patent Application (OPI) Nos. 71332/75, 30328/78, 155528/77, 125/78 and 1024/78, etc., are illustrative.

In addition, the mordants disclosed in U.S. Pat. Nos. 2,675,316 and 2,882,156 can be used.

The dye fixing layer (II) can have a white reflective layer. For example, a layer of titanium dioxide dispersed in gelatin can be provided on the mordant layer on a transparent support. The layer of titanium dioxide forms a white opaque layer, by which reflection color images of the transferred color images which is observed through the transparent support are obtained.

A typical dye fixing material used in the present invention is obtained by mixing a polymer containing ammonium salt groups with gelatin and applying the mixture to a transparent support.

The transfer of dyes from the light-sensitive layer to the dye fixing layer can be carried out using a dye transfer assistant. Examples of useful dye transfer assistants include water and an alkaline aqueous solution containing sodium hydroxide, potassium hydroxide and an inorganic alkali metal salt. Further, a solvent having a low boiling point such as methanol, N,N-dimethylformamide, acetone, diisobutyl ketone, etc., and a mixture of such a solvent having a low boiling point with water or an alkaline aqueous solution can be used. The dye transfer assistant can be employed by wetting the image receiving layer with the transfer assistant or by incorporating it in the form of water of crystallization or microcapsules into the material.

EXAMPLE 1

The method of preparing a silver iodobromide emulsion is described below.

40 g of gelatin and 26 g of potassium bromide (KBr) were dissolved in 3,000 ml of water and the solution was stirred while maintaining the temperature at 50° C. A solution containing 34 g of silver nitrate dissolved in 200 ml of water was then added to the above prepared solution over a 10 minute period. Subsequently, a solution of 3.3 g of potassium iodide (KI) dissolved in 100 ml of water was added thereto over a 2 minute period.

By controlling the pH of the silver iodobromide emulsion, precipitates were formed and excess salts were removed. The pH of the emulsion was then adjusted to 6.0 and 400 g of a silver iodobromide emulsion was obtained.

The method of preparing a benzotriazole silver salt emulsion is described below.

28 g of gelatin and 13.2 g of benzotriazole were dissolved in 300 ml of water, and the solution was stirred while maintaining the temperature at 40° C. A solution containing 17 g of silver nitrate dissolved in 100 ml of water was added to the above solution over a 2 minute period. By controlling the pH of the silver iodogromide emulsion, precipitates were formed and exess salts were removed. The pH of the emulsion was then adjusted to 6.0 and 400 g of a benzotriazole silver salt emulsion was obtained.

The method of preparing a gelatin dispersion of a dye releasing redox compound containing the compound of the present invention is described below.

5 g of Yellow Dye Releasing Redox Compound (7) of the present invention, 0.5 g of sodium 2-ethylhexylsuccinate sulfonate as a surface active agent, and 5 g of tricresyl phosphate (TCP) were weighed out and dissolved in 30 ml of ethyl acetate by heating at about 60° C. to form a uniform solution. This solution was mixed with 100 g of a 10% aqueous solution of lime-treated gelatin and then dispersed using a homogenizer at 10,000 rpm for 10 minutes.

This dispersion is designated a dispersion of the dye releasing redox Compound (7).

The method of preparing light-sensitive coating samples A and B is described below.

| Light-sensitive Coating Sample A | | |
|---|---|---|
| (a) | Light-Sensitive Silver Iodobromide Emulsion | 25 g |
| (b) | Dispersion of Dye Releasing Redox Compound (7) | 33 g |
| (c) | 5 wt % Aqueous Solution of the Compound Having the Formula: | 5 ml |

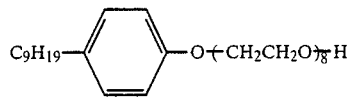

| (d) | 10 wt % Ethanol Solution of Guanidinetrichloroacetic Acid | 12 ml |
| (e) | 10 wt % Aqueous Solution of Dimethylsulfamide | 4 ml |
| (f) | Water | 8 ml |

The above components (a) to (f) were mixed and dissolved and the resulting solution was coated on a polyethylene terephthalate film in a wet thickness of 30 μm. Further, a solution of the following composition was coated thereon as a protective layer in a wet thickness of 25 μm followed by drying. This coated sample is designated "Sample (A)".

| (a) | 10 wt % Aqueous Gelatin Solution | 35 g |
|---|---|---|
| (b) | 10 wt % Ethanol Solution of Guanidinetrichloroacetic Acid | 5 ml |
| (c) | 1 wt % Aqueous Solution of Sodium 2-Ethylhexyl Succinate Sulfonate | 4 ml |
| (d) | Water | 56 ml |
| Light-sensitive Coating Sample B | | |
| (a) | Benzotriazole Silver Salt | 10 g |
| (b) | Silver Iodobromide Emulsion | 20 g |
| (c) | Dispersion of Dye Releasing Redox Compound (7) | 33 g |
| (d) | 5 wt % Aqueous Solution of Compound having the Formula | 5 ml |

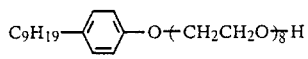

| (e) | 10 wt % Ethanol Solution of Guanidinetrichloroacetic Acid | 12.5 ml |
| (f) | 10 wt % Aqueous Solution of Dimethylsulfamide | 4 ml |
| (g) | Water | 7.5 ml |

The above components (a) to (g) were mixed and dissolved, and the resulting solution was coated on a polyethylene terephthalate film in a wet thickness of 30 μm followed by drying. A protective layer was provided thereon in the same manner as in Sample A.

The method of preparing a dye fixing material is described below.

10 g of poly(methyl acrylate-co-N,N,N-trimethyl-N-vinylbenzylammonium chloride) (the weight ratio of methyl acrylate to vinylbenzylammonium chloride was 1:1) was dissolved in 200 ml of water and the solution was uniformly mixed with 100 g of 10% aqueous solution of lime-treated gelatin. The mixture solution was uniformly coated on a paper support with titanium dioxide-dispersed polyethylene laminated thereon in a wet thickness of 90 μm. This sample was dried and then used as a dye fixing material having a mordant layer.

These samples were dried and then imagewise exposed at 2,000 lux for 10 seconds using a tungsten lamp. Then, the samples were uniformly heated for 30 minutes on a heated block which had been heated at 130° C.

The dye fixing material was dipped in water and the above heated light-sensitive material was superposed on the dye fixing material in such a manner that the coating of the light-sensitive material was in contact with the coating of the dye fixing material. Thereafter, the superposed product was heated for 6 seconds on a heated block which had been heated at 80° C. and the dye fixing material was peeled apart from the light-sensitive material, whereby a negative-working yellow color image was formed on the dye fixing material. The maximum density ($D_{max}$) and the fog density ($D_{min}$) of the negative image to blue light were measured using a Macbeth reflection densitometer (RD-519).

The results obtained are shown in Table 1 below.

TABLE 1

| Sample | Dye Releasing Redox Compound | $D_{max}$ | $D_{min}$ | Gradation* |
|---|---|---|---|---|
| A | 7 | 1.60 | 0.07 | 1.3 |
| B | 7 | 1.85 | 0.08 | 1.4 |

*With respect to 10 times the amount of exposure in the linear portion

From the above results, it can be seen that a sharp yellow color image can be obtained using the dye releasing redox compound of the present invention.

EXAMPLE 2

Samples (C), (D) and (E) were prepared in the same manner as described for light-sensitive coating Sample B in Example 1 except for using dispersions containing 5 g of Dye Releasing Redox Compounds (3), (6) or (12), respectively instead of Dye Releasing Rodox Compound (7). These samples were treated and evaluated in the same manner as described in Example 1. The results obtained are shown in Table 2 below.

| Sample | Dye Releasing Redox Compound | $D_{max}$ | $D_{min}$ |
|---|---|---|---|
| C | 3 | 1.80 | 0.08 |
| D | 6 | 1.95 | 0.15 |
| E | 12 | 1.65 | 0.10 |

It can be seen from the above results that sharp yellow color image can be obtained using the dye releasing redox compounds of the present invention.

While the invention has been described in detail and with reference to specific embodiment thereof, it will be apparent to one skilled in the art that various changes and modifications can be made therein without departing from the spirit and scope thereof.

What is claimed is:

1. A process for forming an image which comprises heating a light-sensitive material comprising a support having thereon at least a light-sensitive silver halide, a binder and a dye-releasing redox compound which is reductive to the light-sensitive silver halide and which is capable of releasing a hydrophilic dye upon reaction with the light-sensitive silver halide on heating, after imagewise exposure or simultaneously with imagewise exposure, in a substantially water-free condition, said dye-releasing redox compound being represented by the formula (I)

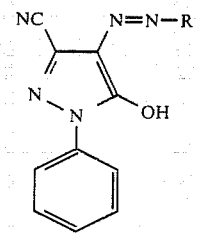

wherein R represents a phenyl group having a hydroxy-substituted alkoxy group or an alkoxy-substituted alkoxy group at the 2-position thereof with respect to the diazo group and a group of the formula —$SO_2NH$—Y at the 5-position thereof with respect to the diazo group where Y represents a group capable of being oxidized by silver halide to release a dye moiety including the —$SO_2NH$ moiety.

2. The process of claim 1, wherein R is a 2-methoxyethoxy group, a 2-ethoxyethoxy group, a 2-hydroxyethoxy group, a 2-(2-methoxyethoxy)ethoxy group, a 2-(2-ethoxyethoxy)ethoxy group, a 2-(2-hydroxyethoxy)ethoxy group, a 2-propoxyethoxy group, a 1-methyl-2-methoxyethoxy group or a 2-butoxyethoxy group.

3. The process of claim 1, wherein Y is a group represented by the general formula (II), (III), (IV), (V), (VI), (VII), (VIII) or (IX)

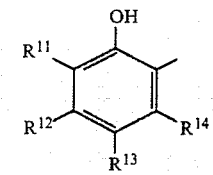
(II)

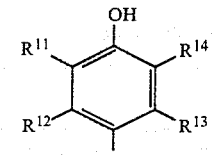
(III)

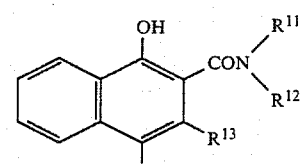
(IV)

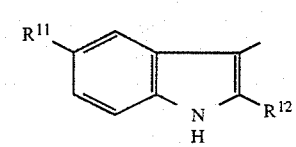
(V)

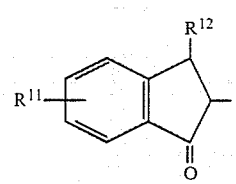
(VI)

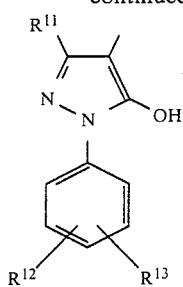
(VII)

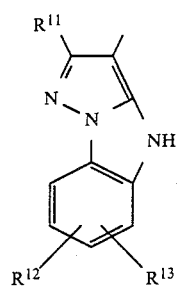
(VIII)

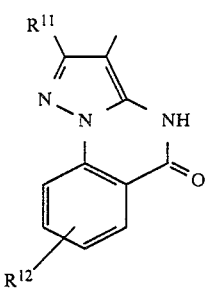
(IX)

wherein $R^{11}$, $R^{12}$, $R^{13}$ and $R^{14}$ each is a hydrogen atom, an alkyl group, a cycloalkyl group, an aryl group, an acyloxy group, an aryloxy group, an aralkyl group, an acyl group, an acylamino group, an alkylsulfonylamino group, an arylsulfonylamino group, an aryloxyalkyl group, an alkoxyalkyl group, an N-substituted carbamoyl group, an N-substitured sulfamoyl group, a halogen atom, an alkylthio group or an arylthio group, wherein the alkyl moiety and the aryl moiety of said groups for $R^{11}$, $R^{12}$, $R^{13}$ and $R^{14}$ may be further substituted with one or more of an alkoxy group, a halogen atom, a hydroxy group, a cyano group, an acyl group, an acylamino group, a substituted carbamoyl group, a substituted sulfamoyl group, an alkylsulfonylamino group, an arylsulfonylamino group, a substituted ureido group or a carboalkoxy group, and wherein the hydroxy group and the amino group in Y may be protected by a protective group capable of conversion into a hydroxy group or an amino group due to a nucleophilic action.

4. The process of claim 1, wherein R represents a group of the general formula (X)

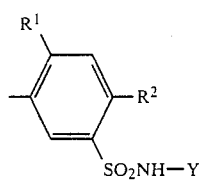
(X)

wherein $R^1$ has the same meaning as R and $R^2$ represents a hydrogen atom for a group as defined by $R^1$.

5. The process of claim 1, wherein said light-sensitive material additionally contains an auxiliary developing agent which is oxidized by said silver halide forming an oxidized product having the ability to oxidize reducing group Y in said dye-releasing redox compound of the general formula (I).

6. The process of claim 1, wherein said light-sensitive material additionally contains a reducing agent.

7. The process of claim 1, wherein said light-sensitive material additionally contains an organic silver salt oxidizing agent.

8. The process of claim 1, wherein said light-sensitive material additionally contains a dye-releasing activator.

9. The process of claim 1, wherein said light-sensitive material additionally contains a compound accelerating development and release of dye and represented by the following general formula

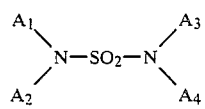

wherein $A_1$, $A_2$, $A_3$ and $A_4$, each is a hydrogen atom, an alkyl group, a substituted alkyl group, a cycloalkyl group, an aralkyl group, an aryl group, a substituted aryl group or a heterocyclic group; and $A_1$ and $A_2$ or $A_3$ and $A_4$ may combine and form a ring.

10. The process of claim 1, wherein said light-sensitive material comprises a light-sensitive layer (I) containing at least a silver halide, an organic silver salt oxidizing agent, a dye-releasing redox compound of the formula (I), and a binder; and a dye-fixing layer (II) capable of receiving the hydrophilic diffusible dye formed in light-sensitive layer (I).

11. A heat-developable light-sensitive material comprising a support having thereon at least a light-sensitive silver halide, a binder and a dye-releasing redox compound which is reductive to the light-sensitive silver halide and which is capable of releasing a hydrophilic dye upon reaction with the light-sensitive silver halide on heating, after imagewise exposure or simultaneously with imagewise exposure, in a substantially water-free condition, said dye-releasing redox compound being represented by the formula (I)

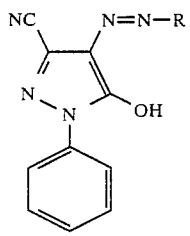

wherein R represents a phenyl group having a hydroxy-substituted alkoxy group or an alkoxy-substituted alkoxy group at the 2-position thereof with respect to the diazo group and a group of the formula —SO$_2$NH—Y at the 5-position thereof with respect to the diazo group where Y represents a group capable of being oxidized by silver halide to release a dye moiety including the —SO$_2$NH moiety.

* * * * *